Oct. 10, 1950            A. BERNDT            2,525,335
GEARING DEVICE
Filed June 14, 1946
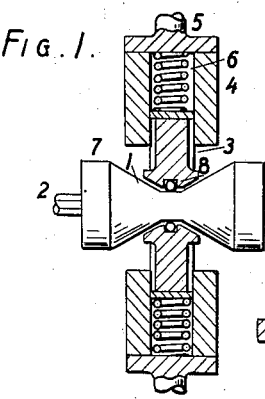
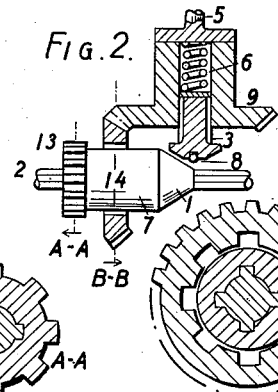
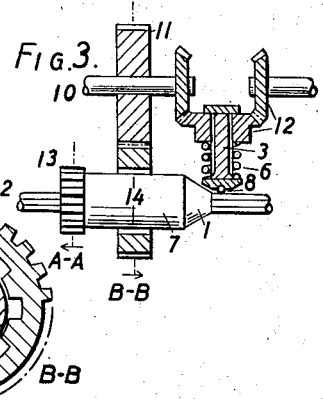
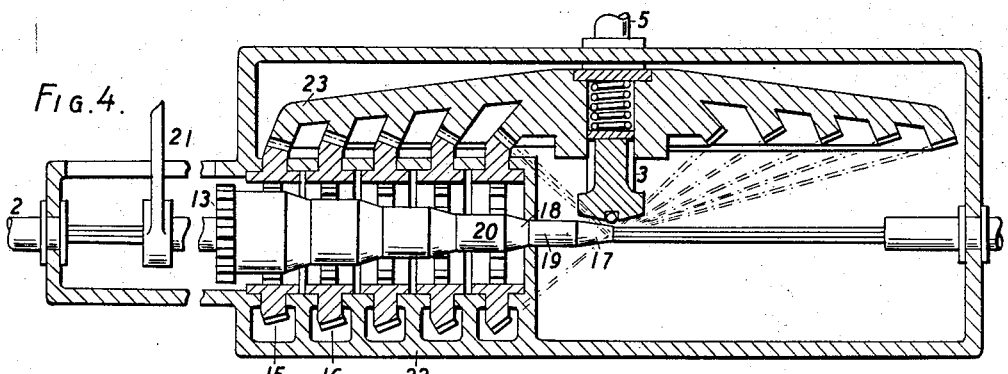
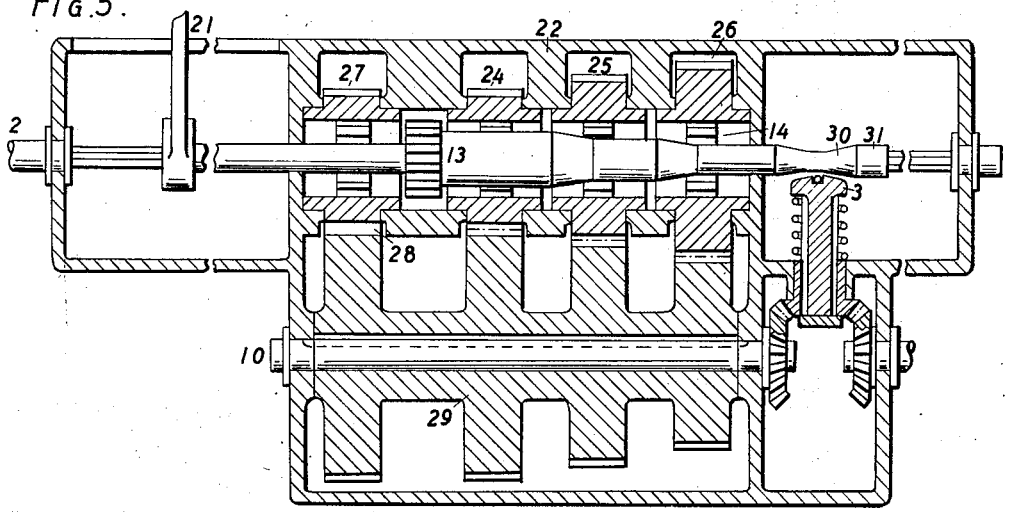
INVENTOR.
Arthur Berndt Patented Oct. 10, 1950

2,525,335

UNITED STATES PATENT OFFICE 2,525,335

GEARING DEVICE

Arthur Berndt, New York, N. Y.

Application June 14, 1946, Serial No. 676,700

3 Claims. (Cl. 74—339)

This invention relates to a combined toothed and friction gearing of the general character described in the copending application Ser. No. 558,105 filed October 10, 1944. The feature of the invention is a fluent mechanical drive, connecting two shafts of different speed during rotation without stopping or eliminating the power, synchronizing and engaging unlimited sets of gears at any speed ratio successively one after another, infinitely like a fluent mechanical speed-bridge, the gearing operated by any conventional shifting device, preferably automatically.

The object of the invention is first, to improve the essential parts of the combined toothed and friction gearing as conical cam and friction cylinder of the character described in Ser. No. 558,105, now Patent # 2,435,122.

Object of the invention is further, to construct a new type of gearing at continuously variable speed by means of shifting coaxial clutches thru the hub of constant meshed gears, successively synchronizing and engaging unlimited sets of gears at any speed ratio, the gearing being of positive displacement as the applied friction elements are ingredients of an intermeshed gearing-system.

Other objects of the invention will be more apparent in the following description taken in connection with the accompanying drawings, in which:

Figs. 1, 2 and 3 are side plan views partly in section, showing schematically the improved conical cam and friction cylinder of the character described in Ser. No. 558,105 and their operation by shifting a spline like clutch thru the hub of the gear, Figs. 4 and 5 are side plan views partly in section showing a fluent mechanical speed-bridge in a speed change mechanism at continuously variable speed corresponding to Figs. 1, 2 and 3, A—A, B—B are transversal sections as indicated.

Fig. 1 shows conical cams and friction cylinders of the character described in Ser. No. 558,-105. Two opposite cones 1 are joined at their apex and splined to the driving shaft 2. Two (or more) friction cylinders 3 mounted around the cones are movably splined to a supporting housing 4 which is fixed to the driven shaft 5, the friction cylinders having conical friction surface corresponding to the cones. A compression spring 6 is pressing the friction cylinder against the conical cams. The cone sliding along the friction cylinder is causing a gradually increasing friction power equalizing and thus synchronizing different speeds of driving and driven shafts, as detailed described in Ser. No. 558,105. Additionally to the conical cams 1 are cylinder-cams 7 and to the friction cylinders a center-ball 8 imbedded at the apex for an anti-frictional contact during mesh. The cone-arrangement 1 allows a reverse motion and a number of friction cylinders permits an increase of friction power at several contacts and a power-transmission to different directions.

Figs. 2 and 3 are showing transmissions with cone- and cylinder-cams and friction cylinders like Fig. 1 at one set of constant meshed gears, shifting a spline like clutch axially thru the hub of the gear, Fig. 2 (for right angle shaft-drive) with friction cylinder 3 inside the driven bevel gear 9, and Fig. 3 (for parallel shaft-drive) with friction cylinder 3 connected to the driven parallel gear 11 by means of beveled pinion-train 12 at the countershaft 10.

One of the intermeshed gears is fixed to the driven shaft 5 respectively to the countershaft 10 and the other gear is carried by and freely turning around the driving shaft 2. A clutch 13 with external spline like teeth and conical and cylinder-cams 1 respectively 7 are mounted together to a sliding clutch-cam-block which is splined to the driving shaft 2.

In operation the clutch-cam-block moves coaxially from neutral, as seen in the drawing, thru the hub of the gear toward the friction cylinder, first synchronizing different speeds by frictional contact of conical cam with friction cylinder, then disengaging friction elements by anti-frictional contact of center-ball 8 with cylinder-cam 7, and meshing the teeth of the clutch 13 with corresponding coaxial teeth 14 in the hub-center of the gear, thus locking the intermeshed gears with the clutch.

As seen at the transversal sections A—A and B—B a plurality of equally sized and spaced spline teeth is provided on the clutch and corresponding teeth in the hub-center of the gear, to facilitate the operation.

Fig. 4 shows the operation of a fluent mechanical speed-bridge in a change speed-transmission box corresponding to Figs. 1 and 2 with a number of bevel-gears and cone- and cylinder-cams, containing five constant meshed gear-sets 15, 16 etc. at a progressive gear-ratio (between 1:4 and 1:1), all gears having the same pitch cone center. The spline-clutch 13 is mounted with five conical cams 17, 18 etc. and five cylinder cams 19, 20 etc. and with the shift-lever 21 to a sliding clutch-cam-block, which is splined to the driving shaft 2. Size of cams and friction cylinder is proportional to the ratio of corresponding gears, cams and gears in suitable distances for a successive action.

Like Fig. 2 one gear of each set is carried by the driving shaft and freely turning about its clutch-cam-block, the gears suitably journalled at 22 and in the hub-center provided with spline teeth 14. The corresponding gears carried by the driven shaft 5 are suitably fastened together or preferably cast in one piece as seen in the drawing at 23.

In operation the clutch-cam-block moves like Fig. 2, first synchronizing the gear-set 15 by frictional contact of friction cylinder 3 with cone-cam 17, then disengaging friction elements by anti-frictional contact of center-ball 8 with cylinder-cam 19, and meshing the teeth of the spline-clutch 13 with corresponding teeth 14 in the hub center of the gear, thus locking the gear-set 15 with the clutch. Continuing the said motion the clutch-cam-block slides further thru the hub of the gear 15 and as seen as the gear-set 15 is completely disengaged the friction cylinder contacts the cone-cam 18 synchronizing the next gear-set 16, then disengaging friction elements at center-ball 8 and cylinder-cam 20 and locking gear-set 16 together with the clutch, then disengaging gear-set 16 and repeating this gearing-process until all five gear-sets are successively synchronized and locked. Moving the clutch-cam-block in opposite direction until neutral all gear-sets will be successively resynchronized and relocked in the opposite way.

Fig. 5 shows the operation of a fluent mechanical speed-bridge in a change speed-transmission box corresponding to Figs. 1 and 3 with a number of parallel gears and cone- and cylinder-cams, containing three constant meshed sets of gears 24, 25 and 26 at a progressive gear-ratio (1:2, 1:1.5 and 1:1) and for reverse motion opposite to the clutch one separate gear-set 27 at gear-ratio of 1:2 intermeshed with a reversing pinion at 28, the spline-clutch mounted with four cone- and cylinder-cams and shift-lever 21 to a sliding clutch-cam-block, which is splined to the driving shaft 2. The gears are carried and journalled like in Fig. 4, the gears 29 keyed to the countershaft 10 and preferably cast in one piece.

In operation the clutch-cam-block moves in both directions like in Fig. 4, synchronizing, engaging and disengaging successively the gear-sets 24, 25 and 26. For reverse motion the clutch-cam-block moves from neutral in opposite direction engaging the reverse gears 27 and reversing pinion at 28 after synchronization by frictional contact of friction cylinder 3 with an opposite cone-cam, which are in mesh with the anti-frictional contact of center-ball with cylinder-cam 31 during positive engagement.

Fig. 6 shows a different combination of conical cams and friction cylinders.

I claim:

1. In a speed changing mechanism of intermeshing gear-cones wherein the speed change is accomplished by shifting a sliding key-clutch: a gear-cluster including a driving shaft, and a driven shaft, a toothed key-clutch splined to the driving shaft and movable thru the hub of the gears, said shafts carrying plural sets of gears at a progressive speed-ratio, the gears carried by the driving shaft being provided in the hub-center with coaxial teeth corresponding to the clutch-teeth; a speed-bridge for variable speed control consisting of conical friction cams and cylindrical cams coaxially connected with said key-clutch, and a friction cylinder spring actuated and splined to a supporting housing connected to the driven shaft, said friction cylinder being provided with a conical friction surface for frictional engagement with said conical friction cams, to synchronize successively different speeds before clutching; a center-ball on the apex of said friction cylinder for antifrictional contact with said cylindrical cams during clutching-periods; the size of cams and friction cylinder being proportional to the corresponding gears, and said gears and cams being suitably spaced for successive action.

2. In a speed changing mechanism of intermeshing gear-cones wherein the speed change is accomplished by shifting a sliding key-clutch: a gear-cluster including a driving shaft, and at right angle a driven shaft, a toothed key-clutch splined to the driving shaft and movable thru the hub of the gears, said shafts carrying plural sets of bevel-gears at a progressive speed-ratio, the gears carried by the driving shaft being provided in the hub-center with coaxial teeth corresponding to the clutch-teeth; a speed-bridge for variable speed control consisting of conical friction cams and cylindrical cams coaxially connected with said key-clutch, and a friction cylinder spring actuated and splined to a supporting housing mounted to the driven shaft, said friction cylinder being provided with a conical friction surface for frictional engagement with said conical friction cams, to synchronize successively different speeds before clutching; a center-ball on the apex of said friction cylinder for antifrictional contact with said cylindrical cams durings clutching-periods; the size of cams and friction cylinder being proportional to the corresponding gears, and said gears and cams being suitably spaced for successive action.

3. In a speed changing mechanism of intermeshing gear-cones wherein the speed change is accomplished by shifting a sliding key-clutch: a gear-cluster including a driving shaft, and a parallel driven shaft, a toothed key-clutch splined to the driving shaft and movable thru the hub of the gears, said shafts carrying plural sets of spur-gears at a progressive speed-ratio, the gears carried by the driving shaft being provided in the hub-center with coaxial teeth corresponding to the clutch-teeth; a speed-bridge for variable speed control consisting of conical friction cams and cylindrical cams coaxially connected with said key-clutch, and a friction cylinder spring actuated and splined to a supporting housing and connected to the driven shaft by means of a beveled pinion-train, said friction cylinder being provided with a conical friction surface for frictional engagement with said conical friction cams, to synchronize successively different speeds before clutching; a center-ball on the apex of said friction cylinder for antifrictional contact with said cylindrical cams during clutching-periods; the size of cams and friction cylinder being proportional to the corresponding gears, and said gears and cams being suitably spaced for successive action.

ARTHUR BERNDT.

REFERENCES CITED

The following references are of record in the file of this patent:

UNITED STATES PATENTS

| Number | Name | Date |
|---|---|---|
| 936,338 | Mayo | Oct. 12, 1909 |
| 1,037,718 | Babcock | Sept. 3, 1912 |
| 1,241,924 | Cole | Oct. 3, 1917 |
| 1,450,266 | Taylor | Apr. 3, 1923 |
| 1,620,760 | Hayes | Mar. 15, 1927 |
| 2,416,154 | Chilton | Feb. 18, 1947 |

FOREIGN PATENTS

| Number | Country | Date |
|---|---|---|
| 196,836 | Great Britain | May 3, 1923 |